US012691824B2

(12) United States Patent
Baker et al.

(10) Patent No.: US 12,691,824 B2
(45) Date of Patent: Jul. 28, 2026

(54) TURN SIGNAL INDICATORS INTEGRATED WITH SIDE MIRRORS OF A VEHICLE

(71) Applicant: Rivian IP Holdings, LLC, Irvine, CA (US)

(72) Inventors: Simon Baker, Basingstoke (GB); Siobhan Marie Casey, Newport Beach, CA (US); Timothy Beaven, Bicester (GB); Micheal Richard Castiglione, Carlsbad, CA (US); Shammika Ashan Wickramasinghe, Banbury (GB); Thomas Joseph Harezlak, Long Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/000,395

(22) Filed: Dec. 23, 2024

(65) Prior Publication Data

US 2025/0256649 A1 Aug. 14, 2025

Related U.S. Application Data

(60) Provisional application No. 63/553,610, filed on Feb. 14, 2024.

(51) Int. Cl.
*B60R 1/12* (2006.01)
*B60Q 1/34* (2006.01)

(52) U.S. Cl.
CPC .............. *B60R 1/1207* (2013.01); *B60Q 1/34* (2013.01)

(58) Field of Classification Search
CPC ........ B60Q 1/2665; B60Q 1/34; B60R 1/1207
USPC ................................................... 362/494, 135
See application file for complete search history.

(56) References Cited

U.S. PATENT DOCUMENTS

| 2010/0067253 | A1* | 3/2010 | Fehn | .................... | G02B 6/0091 |
| | | | | | 362/602 |
| 2017/0036603 | A1* | 2/2017 | Brummel | .................. | B60R 1/04 |
| 2019/0351830 | A1* | 11/2019 | Bosma | ................. | B60Q 1/2665 |

* cited by examiner

*Primary Examiner* — Thomas M Sember
(74) *Attorney, Agent, or Firm* — BAKERHOSTETLER

(57) ABSTRACT

Side mirrors for vehicles may include a side turn indicator and in some cases an image sensor and a side turn indicator. Side mirrors may further include a bezel coupled with a housing, with the bezel surrounding a mirror. The bezel may include one or more openings, with the opening(s) having a lens. The side turn indicator may include a light source aligned with each respective lens. The bezel may hide, or otherwise obscure, the light source when unilluminated. However, when the light source is illuminated, light from the respective light sources passes through the bezel (via the lenses and the openings) and the turn signal indicator is visible to present an indication to which the vehicle may turn.

17 Claims, 8 Drawing Sheets

1000

PROVIDE A SIDE TURN INDICATOR                    1002

PROVIDE A BEZEL CONFIGURED TO COVER THE
SIDE TURN INDICATOR                              1004

TURN SIGNAL INDICATORS INTEGRATED WITH SIDE MIRRORS OF A VEHICLE

CROSS-REFERENCE TO RELATED APPLICATION(S)

This application claims the benefit of priority to U.S. Provisional Application No. 63/553,610, filed Feb. 14, 2024, titled "TURN SIGNAL INDICATORS INTEGRATED WITH SIDE MIRRORS OF A VEHICLE", the disclosure of which is incorporated herein by reference in its entirety.

INTRODUCTION

The present disclosure is directed to vehicles, and more particularly, vehicles with turn signals integrated with side mirrors.

SUMMARY

Vehicles may include one or more lamps, some of which are used to provide an indication to drivers in other vehicles as well as to pedestrians. For example, vehicles may include lamps designed to illuminate and provide a turn signal indication when the vehicle intends to turn in a direction (e.g., left turn, right turn).

In one or more aspects of the present disclosure, an apparatus is disclosed. The apparatus may include a bezel configured to couple to a housing and surround a mirror. The apparatus may further include a first light source configured to provide an indication for a vehicle. The first light source, in an unilluminated state, may be at least partially hidden by the bezel. Also, the first light source, in an illuminated state, may be configured to provide light through the bezel.

The apparatus may further include an image sensor carried by the housing. The image sensor may be configured to detect one or more objects external to the vehicle. The apparatus may further include a second light source configured to provide the indication. The bezel may cover the first light source and the second light source. The bezel may include an indentation, and the image sensor may be at least partially positioned in the indentation. The indentation may be positioned between the first light source and the second light source. The first light source and the second light source may provide a side turn indicator indicating a direction of travel for the vehicle.

The bezel may include a lens. The lens may include a first material may be configured to block light from the first light source, and a second material may be configured to transmit the light from the first light source.

The bezel may include: a first lens portion configured to block light from the first light source, and a second lens portion configured to transmit the light from the second light source.

In one or more aspects of the present disclosure, a side mirror is disclosed. The side mirror may include a housing configured to extend from a door. The side mirror may further include an image sensor carried by the housing. The image sensor may be configured to detect one or more objects external to the door. The side mirror may further include a side turn indicator disposed on the image sensor. The side turn indicator may include a first light source configured to illuminate and indicate a change of direction of the door.

The side mirror may further include a wall. The side turn indictor may be disposed on the wall. The side mirror may further include a bezel. The bezel may include a first lens portion configured to block light from the first light source. The bezel may include a second lens portion configured to transmit the light from the first light source.

The side mirror may further include a second side turn indicator. The image sensor may be positioned between the first side turn indicator and the second side turn indicator.

The side mirror may further include a second side turn indicator that include a second light source. The side mirror may further include a bezel that covers the first side turn indicator and the second side turn indicator. The bezel may include an indentation that includes one or more recessed surfaces. The image sensor may be positioned in the indentation.

The side mirror may further include a housing component positioned between the first light source and the image sensor. The housing component may be configured to block light generated from the first light source.

In one or more aspects of the present disclosure, a vehicle is disclosed. The vehicle may include a first door and a second door. The vehicle may further include a first side mirror and a second side mirror. The first side mirror and the second side mirror may extend from the first door and the second door, respectively. Each of the first side mirror and the second side mirror may include: a bezel configured to couple to a housing and surround a mirror; and a first light source configured to provide an indication for the vehicle. The first light source, in an unilluminated state, may be at least partially hidden by the bezel. Also, the first light source, in an illuminated state, may be configured to provide light through the bezel.

Each of the first side mirror and the second side mirror may further include an image sensor carried by the housing. The image sensor may be configured to detect one or more objects external to the vehicle. Each of the first side mirror and the second side mirror may further include a second light source configured to provide the indication. The bezel may cover the first light source and the second light source. The bezel may include an indentation, and the image sensor may be at least partially positioned in the indentation.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The present disclosure is directed to side mirrors with integrated features, such as side turn indicator and in some instances as an image sensor (e.g., camera). Vehicles described herein may include a side mirror positioned on multiple sides of the vehicle (e.g., driver side, passenger side). In this regard, each turn signal indicator, when illuminated, may provide an indication to which direction the vehicle is turning. In one or more implementations, a bezel, representing a frame, surrounds the side mirror. The turn signal indicator may hidden, or otherwise obscured, by the bezel. The bezel may include both opaque and transparent regions, representing region of the bezel in which light is blocked and transmitted, respectively. A transparent region may take the form of a lens that covers turn signal indicator. The transparent region may occupy an opening of the bezel and may be positioned at a location corresponding to the turn signal indicator. The lens may be covered with a material (e.g., coating, shade). However, when illuminated, the turn signal indicator generates light and the lens transmits the light, thus allowing the light to be visible to other drivers and passengers near the vehicle.

Figure 1:
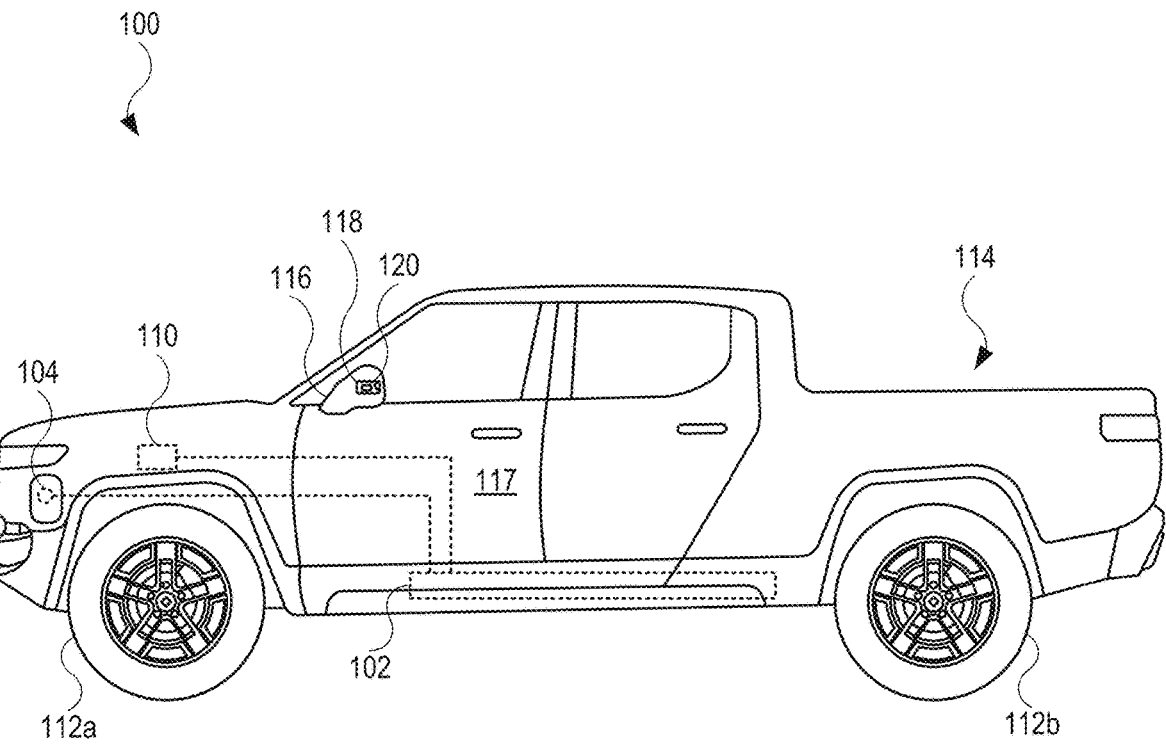
FIG. 1 illustrates a side view of an embodiment of a vehicle, in accordance with one or more aspects of the present disclosure.

FIG. 1 illustrates an example of a vehicle 100, in accordance with aspects of the present disclosure. In the example shown in FIG. 1, the vehicle 100 takes the form of a truck. Generally, the vehicle 100 may take the form of any motorized vehicle, including motorized vehicles with an internal combustion engine and/or one or more electric motors. Accordingly, other implementations of the vehicle 100 may include land-based vehicles, such as a car (e.g., sedan, hatchback), a van, or a commercial truck, as non-limiting examples.

The vehicle 100 may include a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., alternating current (AC) power) that is converted to direct current (DC) power to charge the battery pack 102. The battery pack 102 may couple to a drive unit 110, representative of one or more drive units of the vehicle 100. While the drive unit 110 is shown as generally being in the front of the vehicle 100, the drive unit 110 may be located in the rear of the vehicle 100. Further, when multiple drive units are used, at least one drive unit may be in the front of the vehicle 100 to drive the front wheels (e.g., wheel 112a), and at least one drive unit may be in the rear of the vehicle 100 to drive the rear wheels (e.g., wheel 112b). The drive unit 110 may include, for example, a motor, an inverter, a gear box, and a differential. In the example shown in FIG. 1, the drive unit 110 takes the form of an electric motor. In this regard, the drive unit 110 may use energy (e.g., electrical energy) stored in the battery pack 102 for propulsion in order to drive (e.g., rotationally drive) wheels of the vehicle 100. The vehicle 100 may further include a bed 114 that may be used as a storage area for the vehicle 100.

Further, the vehicle 100 may include an apparatus 116. The apparatus 116 may couple with, and extend from, a door 117 (e.g., driver side door representative of a passenger side door) of the vehicle 100. In one or more implementations, the apparatus 116 takes the form of a driver side mirror. In this regard, the apparatus 116 may provide, based on a reflection from a mirror (not shown in FIG. 1), an image of objects lateral and/or behind a driver's side of the vehicle 100. The apparatus 116 may further include an image sensor 118 (e.g., camera) that provide digital images (e.g., still images, video images) of objects external to the vehicle 100, such as lateral and/or behind a driver's side of the vehicle 100. Additionally, the apparatus 116 may include a side turn indicator 120. The side turn indicator 120 may include one or more light sources (not shown in FIG. 1) that, when illuminated, provide an indication of travel, or change in the direction of travel, of the vehicle 100 (e.g., left turn). Although not shown in FIG. 1, the vehicle 100 may include an additional apparatus that takes the form of a passenger side mirror that include any features shown and/or described for the apparatus 116, with the additional apparatus provide images of objects lateral and/or behind a passenger's side of the vehicle 100, and includes one or more light sources that, when illuminated, provide an indication of travel, or change in the direction of travel, of the vehicle 100 (e.g., right turn).

Figure 2:
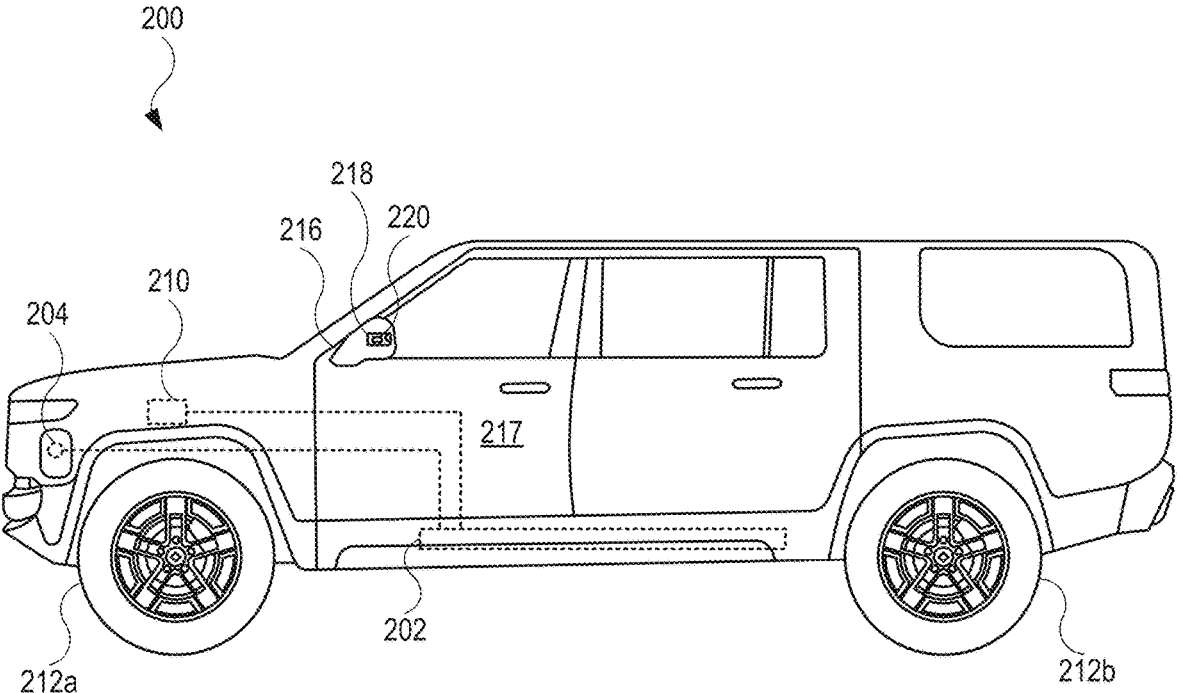
FIG. 2 illustrates a side view of an alternate embodiment of a vehicle, in accordance with one or more aspects of the present disclosure.

FIG. 2 illustrates a side view of an alternate embodiment of a vehicle 200, in accordance with one or more aspects of the present disclosure. As shown, the vehicle 200 takes the form of a sport utility vehicle (SUV). The vehicle 200 may include several features shown and/or described for the vehicle 100 (shown in FIG. 1). For example, the vehicle 200 may include a battery pack 202, a port 204 (e.g., charge port), a drive unit 210 (representative of one or more additional drive units), a wheel 212a (representative of an additional front wheel), and a wheel 212b (representative of an additional rear wheel).

Further, the vehicle 200 may include an apparatus 216. The apparatus 216 may couple with, and extend from, a door 217 (e.g., driver side door representative of a passenger side door) of the vehicle 200. In one or more implementations, the apparatus 216 takes the form of a driver side mirror. In this regard, the apparatus 216 may provide, based on a reflection from a mirror (not shown in FIG. 2), an image of objects lateral and/or behind a driver's side of the vehicle 200. The apparatus 216 may further include an image sensor 218 (e.g., camera) that provide digital images (e.g., still images, video images) of objects lateral and/or behind a driver's side of the vehicle 200. Additionally, the apparatus 216 may include a side turn indicator 220. The side turn indicator 220 may include one or more light sources (not shown in FIG. 2) that, when illuminated, provide an indicated the vehicle 200 may turn (e.g., left turn). Although not shown in FIG. 2, the vehicle 200 may include an additional apparatus that takes the form of a passenger side mirror that include any features shown and/or described for the vehicle 200, with the additional apparatus provide images of objects lateral and/or behind a passenger's side of the vehicle 200, and includes one or more light sources that, when illuminated, provide an indicated the vehicle 200 may turn (e.g., right turn).

FIGS. 3-12 shown and described various implementations of an apparatus that takes the form of a side mirror for use with vehicles. The vehicles shown and/or described herein may be equipped with the apparatuses shown and/or described in FIGS. 3-12.

Figure 3:
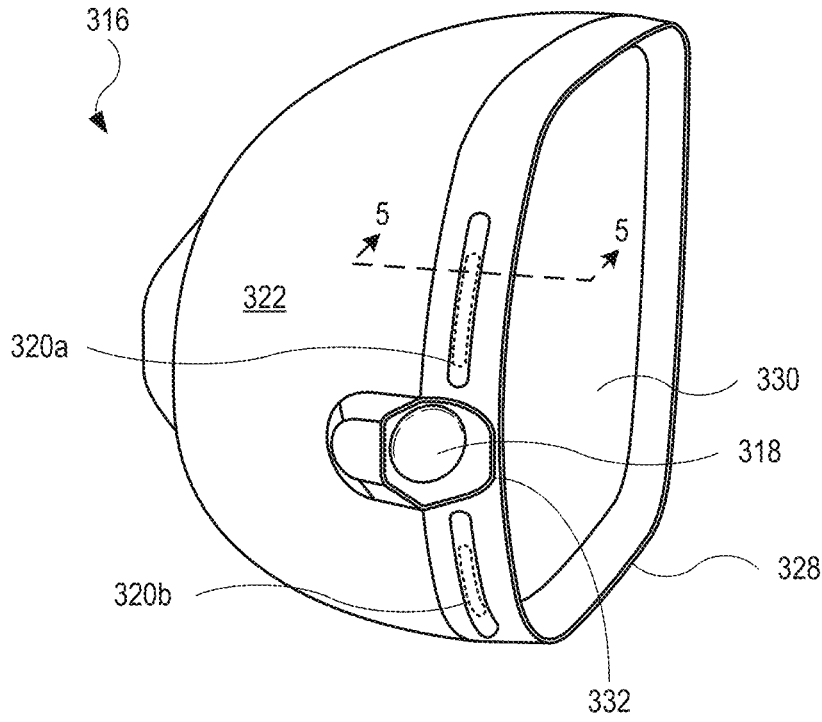
FIG. 3 and FIG. 4 illustrate perspective views of an embodiment of an apparatus with a side turn indicator, accordance with one or more aspects of the present disclosure.
Figure 4:
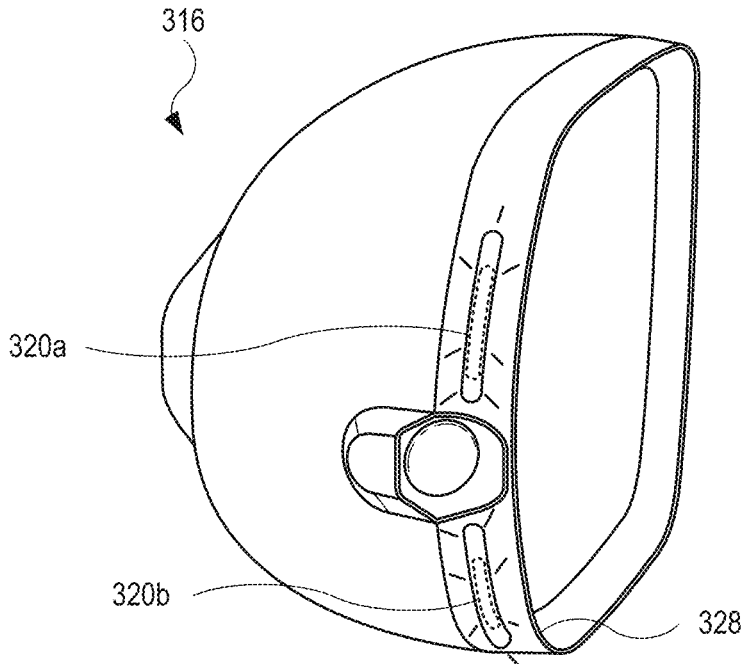

FIG. 3 and FIG. 4 illustrate perspective views of an embodiment of an apparatus 316 with a side turn indicator, in accordance with one or more aspects of the present disclosure. Referring to FIG. 3, the apparatus 316 may include a side turn indicator 320a and a side turn indicator 320b. The side turn indicator 320a and the side turn indicator 320b may each take the form of a light source. The apparatus 316 may further include a housing 322 (e.g., side mirror housing) that carries an image sensor 318 designed to detect objects external to a vehicle. The image 318 may provide data for applications such as self-driving of a vehicle. The housing 322 may further carry the side turn indicators 320a and 320b. In one or more implementations, the side turn indicators 320a and 320b are separate from, and surround, the image sensor 318. The apparatus 316 may further include a bezel 328 coupled with the housing 322. The bezel 328 may represent an edge of the apparatus 316. The bezel 328 may include an indentation 332 (representing one or more recessed surface), and the image sensor 318 may be positioned, or at least partially positioned, in the indentation 332 of the bezel 328. Additionally, the image sensor 318 may be positioned between the side turn indicator 320a and the side turn indicator 320b. The apparatus 316 may further include a mirror 330, and the bezel 328 may surround the mirror 330. However, the mirror 330 may be movable relative to the bezel 328. The bezel 328 may hide, or otherwise, obscure the side turn indicators 320a and 320b when the side turn indicators 320a and 320b are in an unilluminated state (e.g., off, inactive), as shown in FIG. 3. In this regard, the side turn indicators 320a and 320b may include respective light source hidden, or at least partially hidden, by the bezel 328.

Referring to FIG. 4, the side turn indicators 320a and 320b are in an illuminated state (e.g., on, active). When illuminated, the side turn indicators 320a and 320b may periodically turn on and off (e.g., blink). The light generated by the side turn indicators 320a and 320b may pass through the bezel 328. Additional features of the bezel 328 will be shown and described below.

Figure 5:
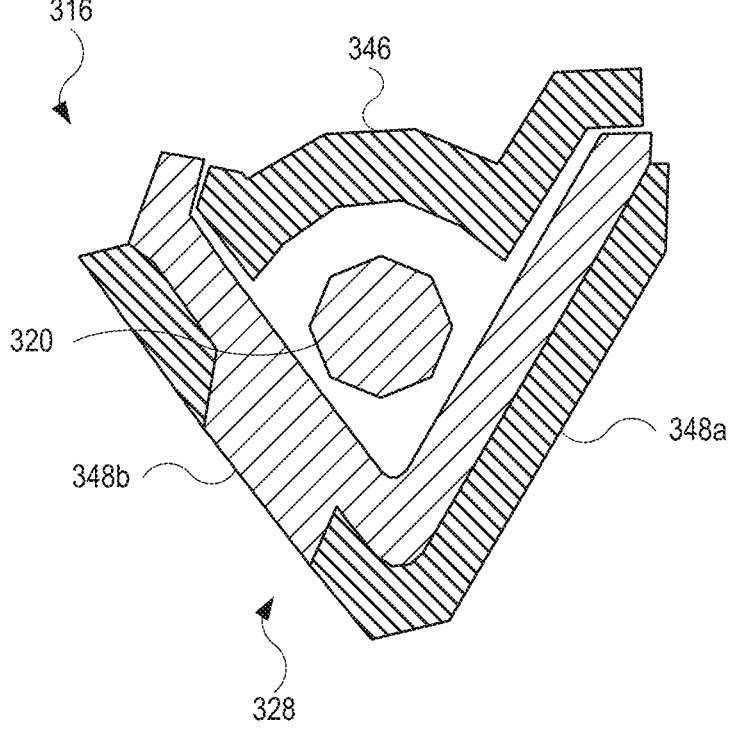
FIG. 5 illustrates a cross-sectional view of the apparatus shown in FIG. 3, taken along line 5-5, in accordance with one or more aspects of the present disclosure.

FIG. 5 illustrates a cross-sectional view of the apparatus 316 shown in FIG. 4, taken along line 5-5, in accordance with one or more aspects of the present disclosure. The apparatus 316 may include a housing 346 that carries the side turn indicator 320a (representative of the side turn indicator 320b shown in FIG. 3). In one or more implementations, the side turn indicator 320 takes the form of a light pipe. In order for the bezel 328 to transmit light, at least some portions of the bezel 328 may take the form of a lens. As shown, the bezel 328 may include a lens portion 348a and a lens portion 348b. The lens portion 348b may include an opaque portion. The lens portion 348a may include an opaque material, or alternatively, may be coated by an opaque material. Conversely, the lens portion 348b may include a transparent, or semi-transparent, portion designed to transmit light from the side turn indicator 320. Alternatively, the lens portions 348a and 348b may be coated by a material that either renders an opaqueness (e.g., opaque material on the lens portion 348a) or a transparent/semi-transparent (e.g., smoke material on the lens portion 348b) condition.

In one or more implementations, the lens portion 348a includes a dark (e.g., black appearance) and the lens portion 348b includes a smoke color. In this regard, the lens portion 348b may hide, or otherwise obscure, the side turn indicator 320 when in an unilluminated state. Put another way, the appearance of the lens portion 348b may be similar to that of the lens portion 348b in terms of attributes such as color.

Figure 6:
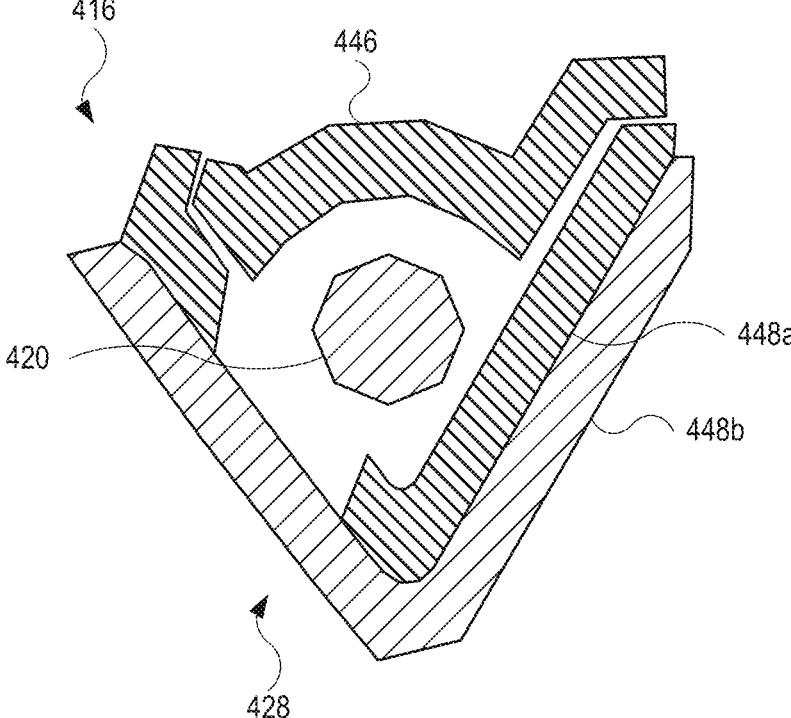
FIG. 6 illustrates a cross-sectional view of an alternate embodiment of an apparatus with a side turn indicator, in accordance with one or more aspects of the present disclosure, in accordance with one or more aspects of the present disclosure.

FIG. 6 illustrates a cross-sectional view of an alternate embodiment of an apparatus 416 with a side turn indicator 420, in accordance with one or more aspects of the present disclosure. The apparatus 416 may include a housing 446 that carries the side turn indicator 420. In one or more implementations, the side turn indicator 420 takes the form of a light pipe. The apparatus 416 may include a bezel 428 takes the form of a lens capable of transmitting through some portions thereof. The bezel 428 may include a lens portion 448a and a lens portion 448b. The lens portion 448b may include an opaque portion. The lens portion 448a may include an opaque material, or alternatively, may be coated by an opaque material. The lens portion 448b may include a transparent, or semi-transparent, portion designed to transmit light from the side turn indicator 420. The lens portion 448a may cover additional regions of the bezel 428, as compared to the lens portion 348a shown in FIG. 5.

FIGS. 7-12 illustrate alternate embodiments of an apparatus with a light source, in accordance with one or more aspects of the present disclosure. Each apparatus shown and described in FIGS. 7-12 may include several features, such as a housing (e.g., housing 322), a bezel (e.g., bezel 328), and a mirror (e.g., mirror 330) shown in FIGS. 3 and 4. However, in some instances, these features may not be expressly recited. Also, each side turn indicator may take the form of a light source.

Figure 7:
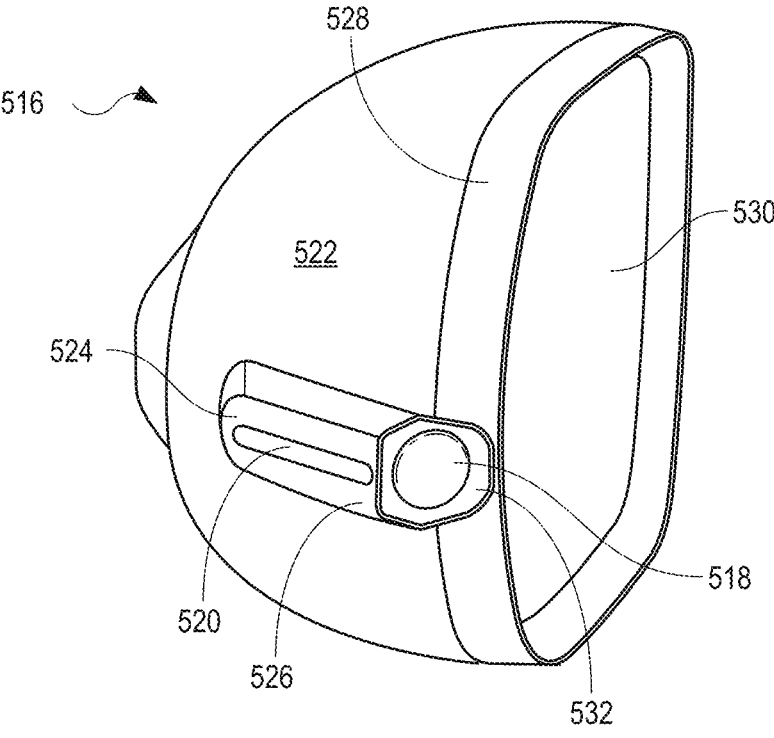
FIG. 7 illustrates a perspective views of an alternate embodiment of an apparatus with a side turn indicator, in accordance with one or more aspects of the present disclosure.

FIG. 7 illustrates a perspective views of an alternate embodiment of an apparatus 516 with a side turn indicator 520, in accordance with one or more aspects of the present disclosure. As shown, the apparatus 516 includes a housing 522 (e.g., side mirror housing) that carries an image sensor 518 designed to detect objects external to a vehicle. The housing 522 may further carry the side turn indicator 520. In one or more implementations, the side turn indicator 520 is integrated with the image sensor 518. In this regard, the image sensor 518 and the side turn indicator 520 may be packaged as a pre-assembly for the apparatus 516. The image sensor 518 may include a wall 524, and the side turn indicator 520 may be disposed (e.g., positioned) on the wall 524. Alternatively, the side turn indicator 520 may be covered by the wall 524, and the wall 524 may be formed by a transparent material or semi-transparent material. The apparatus 516 may further include a lens 526 representing a transparent, or semi-transparent, cover that covers, or overlays, the side turn indicator 520.

The apparatus 516 may further include a bezel 528 coupled with the housing 522. The bezel 528 may represent an edge of the apparatus 516. The apparatus 516 may further include a mirror 530, and the bezel 528 may surround the mirror 530. However, the mirror 530 may be movable relative to the bezel 528. The bezel 528 may include an indentation 532 (representing one or more recessed surface), and the image sensor 518 may be positioned, or at least partially positioned, in the indentation 532 of the bezel 528. The side turn indicator 520 may periodically turn on and off (e.g., blink, thus providing an indication of a direction of travel of a vehicle. Alternatively, the side turn indicator 520 may take the form of a ring and accordingly may generate light that in a direction perpendicular with respect to the wall 524.

The lens 526 may be covered or coated by a material so as to darken the lens 526 while still allowing transmission of light from the side turn indicator 520. Moreover, the material coating the lens 526 may include a color/appearance that matches, or at least substantially matches, the color appearance of the bezel 528.

Figure 8:
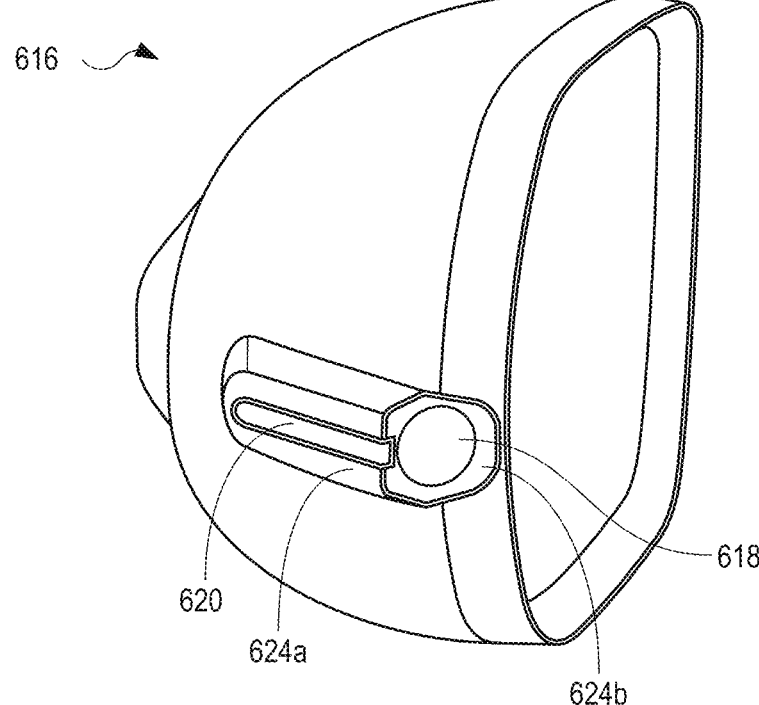
FIG. 8 illustrates a perspective view of an alternate example of an apparatus with a side turn indicator, in accordance with one or more aspects of the present disclosure.

FIG. 8 illustrates a perspective view of an alternate embodiment of an apparatus 616 with a side turn indicator 620, in accordance with one or more aspects of the present disclosure. The apparatus 616 includes an image sensor 618 with a wall 624a and a wall 624b. The walls 624a and 624b may be perpendicular with respect to each other. As shown, the side turn indicator 620 may extend and be disposed on each of the walls 624a and 624b.

Figure 9:
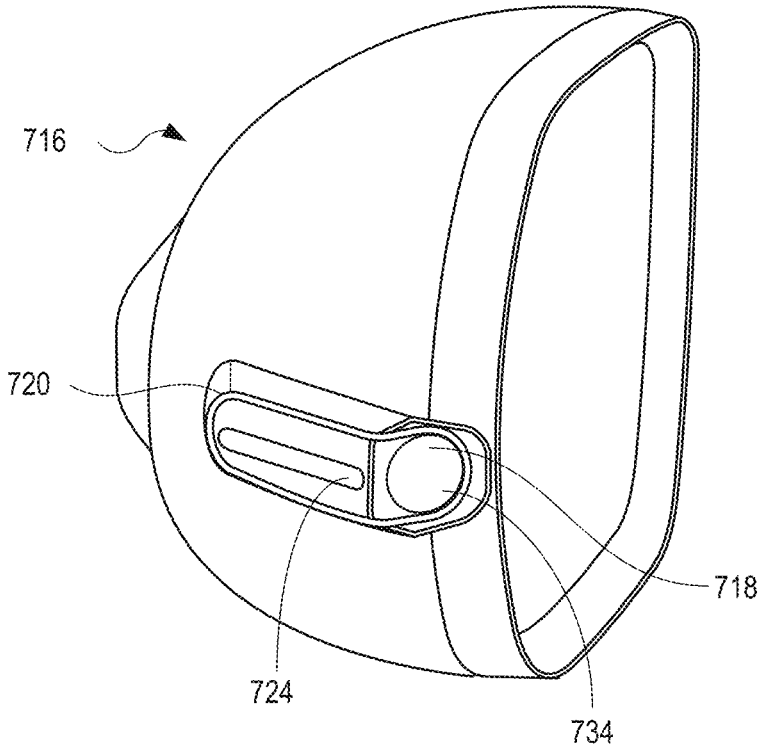
FIG. 9 illustrates a perspective view of an alternate example of an apparatus with a side turn indicator, in accordance with one or more aspects of the present disclosure.

FIG. 9 illustrates a perspective view of an alternate example of an apparatus 716 with a side turn indicator 720, in accordance with one or more aspects of the present disclosure. The apparatus 716 may include an image sensor 718 that includes a wall 724 and a camera lens 734. The side turn indicator 720 may on a perimeter that extends along the wall 724 and surrounds the camera lens 734.

Figure 10:
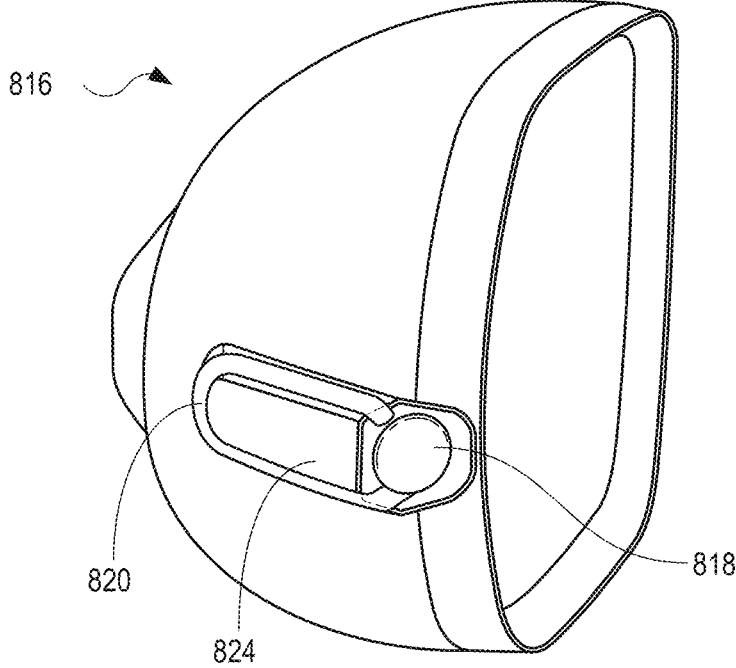
FIG. 10 illustrates a perspective view of an alternate example of an apparatus with a side turn indicator, in accordance with one or more aspects of the present disclosure.

FIG. 10 illustrates a perspective view of an alternate example of an apparatus 816 with a side turn indicator 820, in accordance with one or more aspects of the present disclosure. The apparatus 816 includes an image sensor 818 with a wall 824 and multiple lateral walls (shown, not labeled), or side walls. The side turn indicator 820 may extend along, or be disposed on, several walls so as to surround the wall 824 and generate light in a direction perpendicular with respect to the wall 824.

Figure 11:
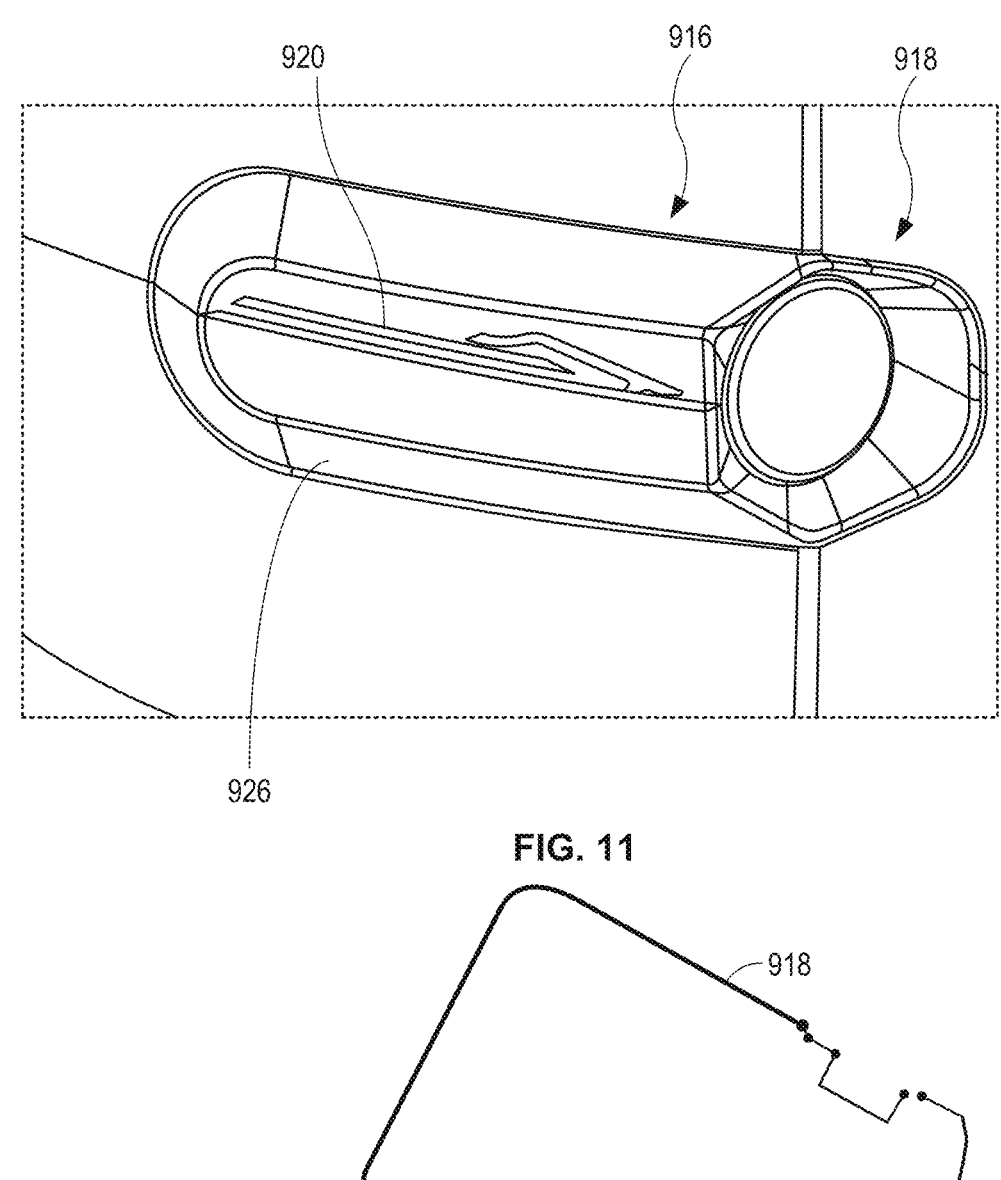
FIG. 11 illustrates a perspective view of an alternate example of an apparatus with a side turn indicator, showing a relationship between a light source and an image sensor, in accordance with one or more aspects of the present disclosure.

FIG. 11 illustrates a perspective view of an alternate example of an apparatus 916 with a side turn indicator 920, showing a relationship between the side turn indicator 920 and an image sensor 918, in accordance with one or more aspects of the present disclosure. The image sensor 918 may include a lens 926 that covers the image sensor 918 and the side turn indicator 920.

Figure 12:
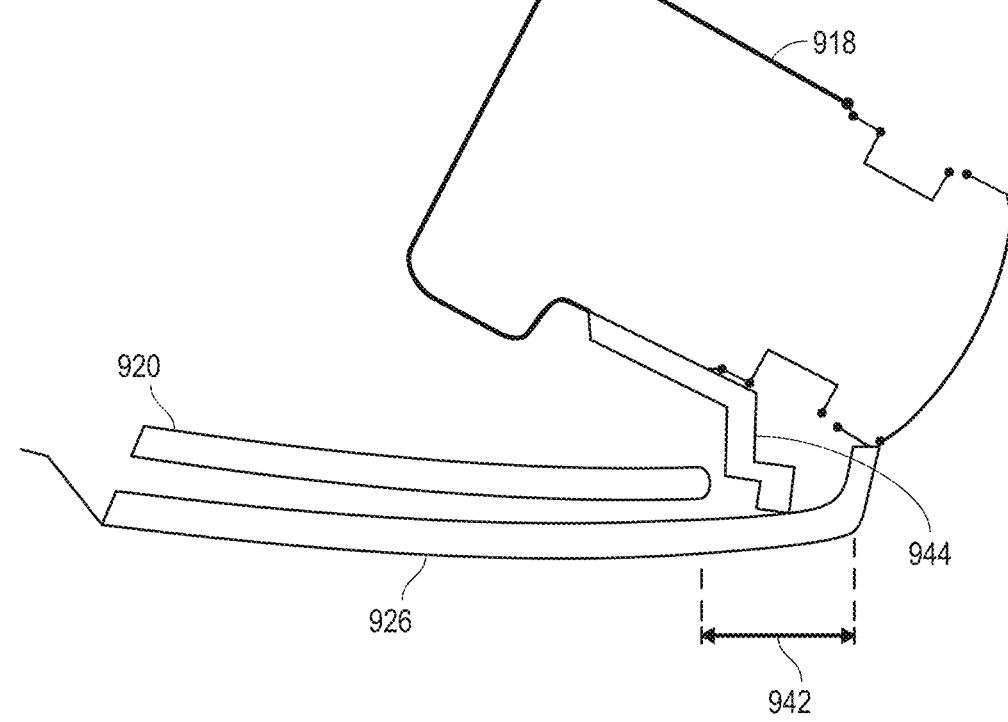
FIG. 12 illustrates an alternate view of the side turn indicator and the image sensor shown in FIG. 11, in accordance with one or more aspects of the present disclosure.

FIG. 12 illustrates an alternate view of the side turn indicator 920 and the image sensor 918 shown in FIG. 11, in accordance with one or more aspects of the present disclosure. As shown, the side turn indicator 920 and the image sensor 918 are separated by a gap 942. The gap 942 may be approximately in the range of 10-16 millimeters. Also, the side turn indicator 920 and the image sensor 918 are separated by a housing component 944. The housing component 944 may include an opaque material designed to block and/or absorb light from the side turn indicator 920, thus limiting or prevent exposure of light generated by the side turn indicator 920 from reaching the image sensor 918.

Figure 13:
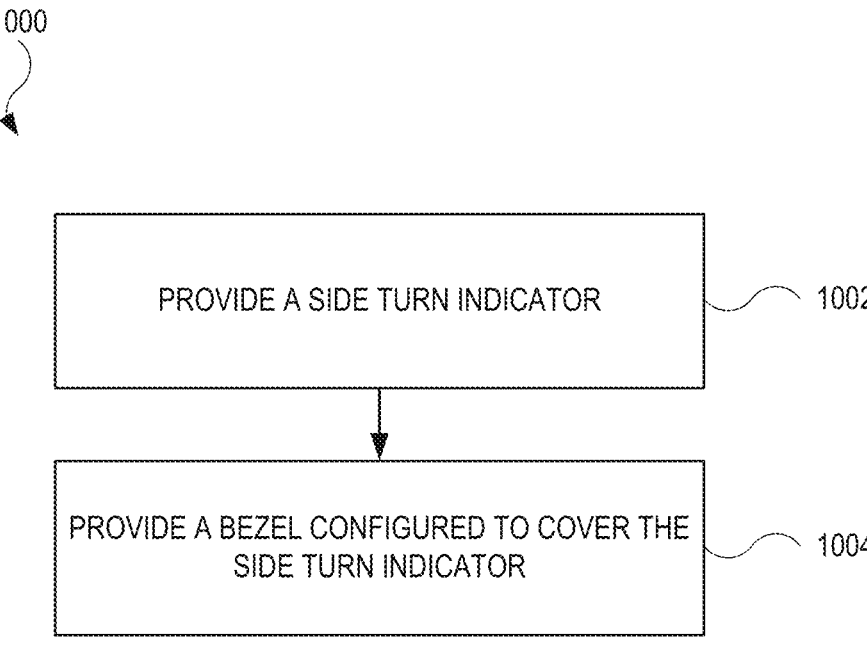
FIG. 13 illustrates a flow diagram showing an example of a process that may be performed for assembling a side mirror, in accordance with one or more aspects of the present disclosure.

FIG. 13 illustrates a flow diagram showing example of a process 1000 that may be performed for assembling a side mirror, in accordance with one or more aspects of the present disclosure. For explanatory purposes, the process 1000 primarily described herein with reference to the apparatuses (e.g., side mirrors) shown and/or described in FIGS. 1-12 and the accompanying portions of this detailed description. However, the process 1000 are not limited to the apparatuses shown and/or described in FIGS. 1-12, and one or more blocks (or operations) of the process 1000 may be performed by one or more other components of other suitable moveable apparatuses, devices, or systems. Further for explanatory purposes, some of the blocks of the process 1000 are described herein as occurring in serial, or linearly. However, multiple blocks of the process 1000 may occur in parallel. In addition, the blocks of the process 1000 need not be performed in the order shown and/or one or more blocks of the process need not be performed and/or can be replaced by other operations.

At block 1002, a side turn indicator is provided. The side turn indicator may include one or more lights.

At block 1004, a bezel configured to cover the side turn indicator is provided. The bezel may include a lens formed from opaque and transparent, or semi-transparent, materials.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus, comprising:
a bezel configured to couple to a housing and surround a mirror;
a first light source configured to provide an indication for a vehicle, the first light source, in an unilluminated state, being at least partially hidden by the bezel, the first light source, in an illuminated state, configured to provide light through the bezel;
an image sensor carried by the housing, the image sensor configured to detect one or more objects external to the vehicle; and a second light source configured to provide the indication, wherein:
the bezel covers the first light source and the second light source,
the bezel comprises an indentation, and
the image sensor is at least partially positioned in the indentation.

2. The apparatus of claim 1, wherein the indentation is positioned between the first light source and the second light source.

3. The apparatus of claim 1, wherein the bezel comprises:
a first lens portion configured to block light from the first light source, and
a second lens portion configured to transmit the light from the second light source.

4. The apparatus of claim 1, wherein the first light source and the second light source provide a side turn indicator indicating a direction of travel for the vehicle.

5. The apparatus of claim 1, wherein the bezel comprises a lens, the lens comprising:
a first material is configured to block light from the first light source, and
a second material is configured to transmit the light from the first light source.

6. A side mirror, comprising:
a housing configured to extend from a door;
an image sensor carried by the housing, the image sensor configured to detect one or more objects external to the door;
a first side turn indicator comprising a first light source configured to illuminate with light and indicate a change of direction of the door;
a bezel comprising:
a first lens portion comprising an opaque portion configured to block the light; and
a second lens portion comprising a transparent portion configured to transmit the light; and
a second side turn indicator a second light source configured to indicate the change of direction, wherein the bezel covers the first light source and the second light source, wherein:
the bezel comprises an indentation, and
the image sensor is at least partially positioned in the indentation.

7. The side mirror of claim 6, wherein the image sensor comprises a wall, and the first side turn indicator is disposed on the wall.

8. The side mirror of claim 7, wherein the second lens portion comprises a coating to obscure the first side turn indicator in an unilluminated state.

9. The side mirror of claim 8,
wherein the image sensor is positioned between the first side turn indicator and the second side turn indicator.

10. The side mirror of claim 7,
wherein the bezel that covers the first side turn indicator and the second side turn indicator.

11. The side mirror of claim 10, wherein the indentation includes one or more recessed surfaces.

12. The side mirror of claim 11, wherein the image sensor is positioned in the indentation.

13. The side mirror of claim 6, further comprising a mirror, wherein the bezel surrounds the mirror.

14. An apparatus, comprising:
a bezel configured to couple to a housing and surround a mirror;
a first light source configured to provide an indication for a vehicle, the first light source, in an unilluminated state, being at least partially hidden by the bezel, the first light source, in an illuminated state, configured to provide a first illumination through the bezel;

a second light source configured to provide the indication for the vehicle, the second light source, in the unillu- minated state, being at least partially hidden by the bezel, the second light source, in an illuminated state, configured to provide a second illumination, separate from the first illumination, through the bezel; and an image sensor positioned between the first light source and the second light source.

15. The apparatus of claim 14, wherein the image sensor configured to detect one or more objects external to the vehicle.

16. The apparatus of claim 15, comprising a second light source configured to provide the indication, wherein the bezel covers the first light source and the second light source.

17. The apparatus of claim 16, wherein:

the bezel comprises an indentation, and the image sensor is at least partially positioned in the indentation.

\* \* \* \* \*